United States Patent
Kubota

(10) Patent No.: US 6,823,067 B1
(45) Date of Patent: Nov. 23, 2004

(54) HINGE DEVICE AND PORTABLE ELECTRONIC DEVICE

(75) Inventor: Naoki Kubota, Nagaoka (JP)

(73) Assignee: Strawberry Corporation, Saitama-Ken (JP)

(*) Notice: Subject to any disclaimer, the term of this patent is extended or adjusted under 35 U.S.C. 154(b) by 0 days.

(21) Appl. No.: 09/913,974

(22) PCT Filed: Feb. 21, 2000

(86) PCT No.: PCT/JP00/00968
§ 371 (c)(1),
(2), (4) Date: Aug. 21, 2001

(87) PCT Pub. No.: WO00/50780
PCT Pub. Date: Aug. 31, 2000

(30) Foreign Application Priority Data

Feb. 22, 1999  (JP) ............................ 11-043952

(51) Int. Cl.[7] ................................................ H04M 1/00
(52) U.S. Cl. ................................................ 379/433.13
(58) Field of Search ...................... 379/433.13; 16/303, 16/305, 308, 324, 326; 455/575.3

(56) References Cited

U.S. PATENT DOCUMENTS

| 5,649,309 A | 7/1997 | Wilcox et al. |
| 5,923,751 A | 7/1999 | Ohtsuka et al. |
| 6,148,480 A | * 11/2000 | Cooke ................... 379/433.13 |

FOREIGN PATENT DOCUMENTS

| EP | 0 535 912 A2 | 4/1993 |
| EP | 0 713 313 | 5/1996 |
| JP | 08-121462 | 5/1996 |
| JP | 8-139793 | 5/1996 |
| JP | 8-247134 | 9/1996 |
| JP | 8-298538 | 11/1996 |
| JP | 09-284165 | 10/1997 |

* cited by examiner

Primary Examiner—Jack Chiang
(74) Attorney, Agent, or Firm—Scully, Scott, Murphy & Presser

(57) ABSTRACT

This hinge device comprises: a hinge element 10 which, along with being made up from an axis body 14 and a hinge main body, is made so that the axis body 14 has a predetermined torque characteristic around an axis relative to said hinge main body; a lock mechanism 30 (a first lock member which has an engagement cutaway 31b, and a second lock member which is biased by a spring 32 in the forwards direction and has an engagement body 34b) which functions so as to lock rotational movement of the axis body 14 around the axis; and a lock release mechanism 40 (a push button 40 having a projection 43) for releasing the locking by the lock mechanism 30. Due to this, it is not necessary for a separate lock mechanism or the like to be provided to a portable electronic device, and it becomes possible to provide a hinge device which contributes to simplification and reduction of space of a portable electronic device.

14 Claims, 9 Drawing Sheets

HINGE DEVICE AND PORTABLE ELECTRONIC DEVICE

TECHNICAL FIELD

The present invention relates to a hinge device for implementing a hinged coupling. Furthermore, it relates to a portable electronic device which includes such a hinge device.

BACKGROUND ART

In recent years, along with the development of electronic technique, various sorts of portable electronic devices have come into widespread use, such as portable telephones, portable computers (including both ones which are equipped with a wireless communication function and ones which are not), electronic notebooks, electronic games machines and the like.

With these portable electronic devices, sometimes it is performed to provide a flip lid which is free to open and close to the portable electronic device. For example, with a portable telephone which is a typical example of such a portable electronic device, there are known both a flip lid type in which a flip lid is fitted to the main body of the portable telephone so that it is free to open and close, and an integral type which has no flip lid. Nowadays the integral type is becoming the mainstream one, from the point of view of weight reduction and convenience.

However there is a demand for increase of the compatibility of both types, due to the merits of the flip lid type in terms of prevention of erroneous switch actuation, increased compactness, diversity of design, and the like.

With the type of portable electronic device which is equipped with the above described kind of flip lid, there is a demand to perform opening and closing of the flip lid easily by one-touch operation.

When a prior art hinge device has been applied for connecting the flip lid to the main body of the portable telephone, it has been necessary to provide a lock mechanism for the flip lid and a drive mechanism such as a button or the like for releasing this lock, separately from the hinge device. Due to this, the problems arise that the number of parts becomes large, it is necessary to provide space for them, etc.

The present invention has been conceived in the light of the above circumstances, and its objective is to provide a hinge device which contributes to simplification and compactness of the structure of a portable electronic device by making it unnecessary to provide the device with a separate mechanism for opening and closing its locking.

Furthermore, an objective of the present invention is to provide a portable electronic device to which this type of hinge device is applied.

DISCLOSURE OF THE INVENTION

The hinge device according to a first aspect of the present invention comprises: a hinge element which is made up from an axis body and a hinge main body and which is constructed so that the axis body possesses a predetermined torque characteristic around a rotational axis with respect to the hinge main body; a lock mechanism which functions so as to lock rotational movement of the axis body around the rotational axis; and a lock release mechanism for releasing locking by the lock mechanism.

In the hinge device according to a second aspect of the present invention, the hinge main body is assembled to a first assembly member and the axis body is assembled to a second assembly member, the torque characteristic, when the rotation of the axis body is locked by the lock mechanism, possesses a torque characteristic such as to bias the first and second assembly members in the direction to mutually contact one another.

In the hinge device according to a third aspect of the present invention, the hinge main body is assembled to a first assembly member and the axis body is assembled to a second assembly member, the torque characteristic, at the moment that the locking by the lock mechanism has been released by the lock release mechanism, possesses a torque characteristic such as to rotate the first and second assembly members in the direction to mutually separate from one another.

In the hinge device according to a fourth aspect of the present invention, the lock mechanism comprises a first lock member which is provided on the side of the axis body so as to be unable to move rotationally relative to the axis body, and a second lock member which is provided on the side of the hinge main body so as to be unable to move rotationally relative to the hinge main body; the lock function by the lock mechanism is provided by concave and convex engagement of these first and second lock members; and the lock release mechanism is a mechanism which can release the concave and convex engagement.

In the hinge device according to a fifth aspect of the present invention, the first lock member comprises a stopper portion; the second lock member comprises an engagement body which can engage with respect to the stopper portion, and which is biased in the direction towards the first lock member by a biasing means; the lock function by the lock mechanism is provided by the engagement body engaging into the stopper portion; and the lock release mechanism is constituted by a push button which is provided on the side of the axis body and which comprises a projection which can be inserted into the stopper portion, and, by the projection being inserted into the stopper portion, the engagement body is pushed in against the resistance of the biasing force due to the biasing means, and thereby the lock is released.

In the hinge device according to a sixth aspect of the present invention, the surface of the engagement body which is pushed in by the projection is formed as a sloping surface, and thereby the pushing in force of the projection is converted into a shift force in the sideways direction of the projection and also into a rotational force of the push button.

In the hinge device according to a seventh aspect of the present invention, the lock mechanism comprises a first lock member which is provided on the side of the axis body so as to be unable to move rotationally relative to the axis body, and a second lock member which is provided on the side of the hinge main body so as to be unable to move rotationally relative to the hinge main body; the lock function by the lock mechanism is provided by concave and convex engagement of the axis body and the second lock member; and the lock release mechanism is a mechanism which can release the concave and convex engagement.

In the hinge device according to an eighth aspect of the present invention, the second lock member comprises an axis portion which passes through the axis body extending along its axis, and which is biased so as to contact against the axis body by a biasing means; and the lock release mechanism is constituted by a push button which is linked to the axis portion of the second lock member, and, by the push button being pushed in, the second lock member is separated from the axis body against the resistance of the biasing force due to the biasing means, and thereby the lock is released.

In the hinge device according to a ninth aspect of the present invention, upon the concave and convex engagement surfaces of the axis body and the second lock member, there are provided sloping portions which guide an engagement convex portion into an engagement concave portion.

A portable electronic device according to a tenth aspect of the present invention comprises a portable electronic device main body and a flip lid which is linked to the portable electronic device main body so as to be able to open and shut with respect thereto, at at least one of both end portions in the widthwise direction of a linking region of the flip lid with respect to the portable electronic device main body, linking of the portable electronic device main body and the flip lid is performed via a hinge device according to the preceding aspects of the present invention.

The portable electronic device according to an eleventh aspect of the present invention comprises a portable electronic device main body and a flip lid which is linked to the portable electronic device main body so as to be able to open and shut with respect thereto, at at least one of both end portions in the widthwise direction of a linking region of the flip lid with respect to the portable electronic device main body, linking of the portable electronic device main body and the flip lid is performed via a hinge device according to the second aspect; in the closed state of the flip lid with respect to the portable electronic device main body, locking is performed by the lock mechanism; and, based upon the torque characteristic of the hinge element, the flip lid, in the closed state of the flip lid, is biased in the further closing direction with respect to the portable electronic device main body.

The portable electronic device according to a twelfth aspect of the present invention comprises a portable electronic device main body and a flip lid which is linked to the portable electronic device main body so as to be able to open and shut with respect thereto, at at least one of both end portions in the widthwise direction of a linking region of the flip lid with respect to the portable electronic device main body, linking of the portable electronic device main body and the flip lid is performed via a hinge device according to the third aspect; in the closed state of the flip lid with respect to the portable electronic device main body, locking is performed by the lock mechanism; and, based upon the torque characteristic of the hinge element, the flip lid, at the instant when the locking by the lock mechanism is released, is opened away from the portable electronic device main body.

According to the first aspect, by the hinge device including the lock mechanism and the lock release mechanism in addition to the hinge element, it is not necessary to provide any separate lock mechanism or lock release mechanism for opening and closing on the side of a device to which this hinge device is applied, and simplification and reduction of space of the device are attained.

According to the second aspect, if the hinge main body is assembled to the first assembly member (for example, a portable electronic device main body) and moreover the axis body is assembled to the second assembly member (for example, the flip lid), then, by the torque characteristic having a torque characteristic, when locking is being performed by the lock mechanism (for example, the closed state of the flip lid with respect to the portable electronic device main body), such as to bias the first and second assembly members in the direction to mutually contact one another, the first and second assembly member do not uselessly rattle together (it is possible to bias them in the closing direction, and there is no rattling ?? in the opening direction).

According to the third aspect, if the hinge main body is assembled to the first assembly member (for example, a portable electronic device main body) and moreover the axis body is assembled to the second assembly member (for example, the flip lid), then, by the torque characteristic having a torque characteristic, at the moment that the locking by the lock mechanism has been released by the lock release mechanism, such as to rotate the first and second assembly members in the direction to mutually separate them from one another, thereby the opening action of the first and second assembly members is performed with a so-called one-touch action by driving the lock release mechanism (the opening action of the flip lid from the portable electronic device main body is performed with a one-touch action).

According to the fourth aspect, the lock function is simply provided by implementing the lock function of the lock mechanism by concave and convex engagement of the first and the second lock members.

According to the fifth aspect, by biasing the second lock member by the biasing means, the engagement of the engagement body with respect to the stopper portion of the first lock member is assisted, and moreover maintenance of the engaged state is implemented. The lock is released by the projection of the push button which provides the lock release function being inserted into the stopper portion, and by the engagement body being pushed in against the resistance of the biasing force of the biasing means.

According to the sixth aspect, by forming the surface upon the engagement body which is pushed in by the projection as a sloping surface, thereby the pushing in force of the projection is converted into a shift force in the sideways direction of the projection and also is converted into a rotational force of the push button. When the hinge main body is assembled to the first assembly member and the axis body is assembled to the second assembly member, at the time of lock release, this rotational force can be taken advantage of for mutually separating the first and the second assembly members from one another, and it assists the opening operation of the first and the second assembly members (in the case of a flip lid and a portable electronic device, it is taken advantage of as flip lid opening up force, and it assists the opening operation).

According to the seventh aspect, the lock function is even more simply provided by implementing the lock function of the lock mechanism by concave and convex engagement of the axis body and the second lock member.

According to the eighth aspect, by biasing the second lock member by the biasing means, the concave and convex engagement with the axis body is assisted, and moreover maintenance of the concave and convex engagement state is implemented. Furthermore, since the push button which provides the lock release function is linked to the axis portion of the second lock member which is passed through the axis body, when the push button is pressed, the second lock member is separated from the axis body against the resistance of the biasing force of the biasing means, and the lock is released.

According to the ninth aspect, when the engagement convex portion approaches relatively to the concave engagement portion and come upon a sloping portion of the concave engagement portion, the convex engagement portion is guided along the sloping portion of the concave engagement portion into the concave engagement portion. Accordingly, the operation during concave and convex engagement becomes smooth.

According to the tenth aspect, by linking the portable electronic device main body and the flip lid via the above described type of hinge device, it is not necessary to provide any separate lock mechanism or lock release mechanism for opening and closing to the portable electronic device main body or to the flip lid, and simplification and reduction of space of the portable electronic device are attained.

According to the eleventh aspect, along with linking the portable electronic device main body and the flip lid via a hinge device according to the second aspect, by locking with the lock mechanism in the closed state of the flip lid with respect to the portable electronic device main body, in the closed state, the flip lid is biased in the further closing direction with respect to the portable electronic device main body based upon the torque characteristic of the hinge element. Due to this, rattling of the flip lid in the opening direction is prevented.

According to the twelfth aspect, along with linking the portable electronic device main body and the flip lid via a hinge device according to the third aspect, by locking with the lock mechanism in the closed state of the flip lid with respect to the portable electronic device main body, at the instant that the locking is released, the flip lid opens up away from the portable electronic device main body based upon the torque characteristic of the hinge element. In other words, the opening operation of the flip lid from the portable electronic device main body is performed by so-called one-touch lock release operation.

BEST MODE FOR CARRYING OUT THE INVENTION

In the following, embodiments of the present invention will be explained with reference to the figures.

Basically the hinge device of the present invention is comprised of a hinge element, a lock mechanism, and a lock release mechanism. Before explaining the hinge device, first the construction of the hinge element will be explained.

First Example of the Hinge Element

Figure 1:
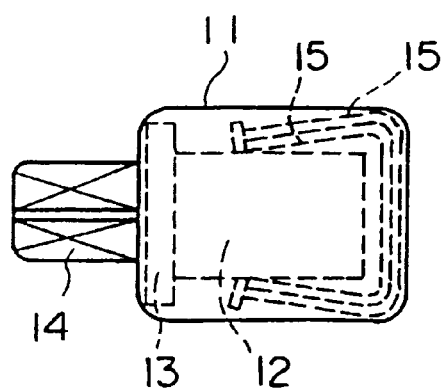
FIG. 1 is a front view showing a first example of a hinge element for the hinge device of the present invention.

FIG. 1 shows a first example of the hinge element, and this hinge element 10 has a construction which comprises a casing 11, a cam 12, a stopper portion 13, an axis body 14, a plate spring 15, etc. In this case, the casing 11, the cam 12, the stopper portion 13, the plate spring 15 etc. constitute a hinge main body of the hinge element 10.

The casing 11 is formed roughly as a square tube in order for it to be endowed with the function of preventing rotation, and is formed with a hole (not shown in the figures) in its front side for protruding the axis body 14.

Figure 2:
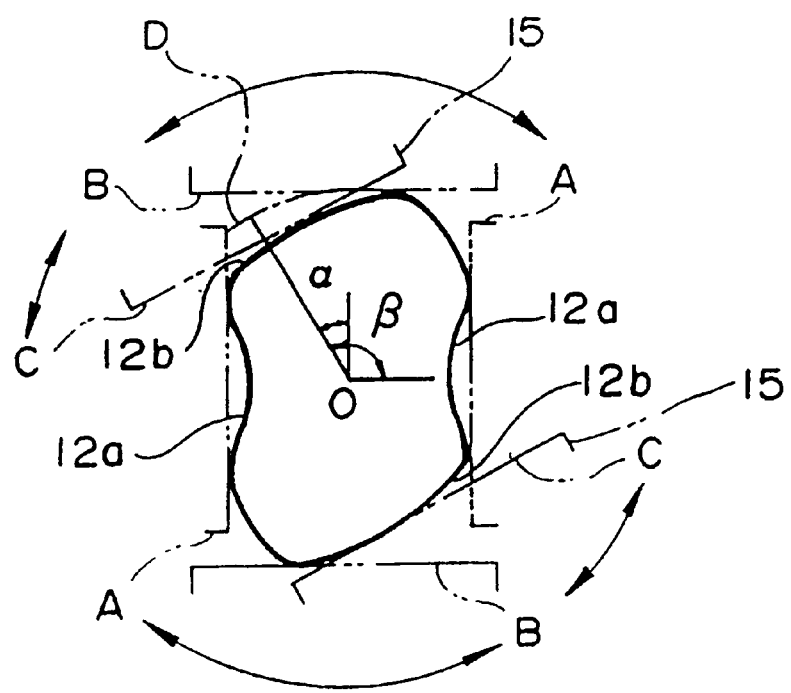
FIG. 2 is a sectional view showing an example of a cam shape for the hinge element of FIG. 1.

The cam 12 is also formed with a cam face around its axis, and it is housed within the casing 11. The cam 12, for example, is formed as shown in FIG. 2, in other words, the cam 12 has a rotation symmetrical shape around its axis O, and, around the axis O, as cam faces, has a support face 12a and a return force bearing face 12b.

Here, to explain the cam operation in the case that the cam 12 which is shown in the drawing by way of example has been applied to a portable electronic device, for example, the opened state of the flip lid, in which it opposes the main body of the portable electronic device, is set so as to be the state A shown in the figure. In this state A, the plate spring 15 presses against the support faces 12a, and the flip lid is stably held with respect to the portable electronic device main body so as to be at an opened angle â (for example 120°) in relation thereto.

Furthermore, the closed state of the flip lid with respect to the main body of the portable electronic device is set so as to be the state shown by C in the figure. In this state C, the plate spring 15 presses against the return force bearing faces 12b. These return force bearing faces 12b are positioned more inwards than a suppositious circular arcuate surface D which takes the axis O as a center, and, due to this, in this closed state, a torque is generated in the plate spring 15 in the direction to close the flip lid, and the flip lid is further biased in the direction to close it.

If the flip lid opens from the closed state, in other words if the plate spring 15 relatively rotates in the rightwards rotational direction as seen in the figure (according to the application example, the cam 12 may also rotate. Since the positional relationship between the cam 12 and the plate spring 15 is a relative matter, either of them can be relatively rotated), when it passes the state B shown in the figure, the flip lid shifts at a stroke (automatically) to the opened state. This shifting angle á can be set to any angle within a certain possible range.

The stopper portion 13 is connected to the forward side of the cam 12 in its axial direction, and is formed to be of a size greater than that of said protrusion hole.

The axis body 14 is connected to the front side of the stopper portion 13, and is formed in a size which can protrude from said protrusion hole. The axis body 14 is formed in a roughly square post shape, so that idle turning should not occur.

The plate spring 15 is made in a roughly letter "U" shape which closes together with a certain closing force, and at its free ends it grips the cam faces (the support faces 12a or the return force bearing faces 12b) of the cam 12 from directions perpendicular to its axial line O. By doing this, the plate spring 15 exerts a torque corresponding to the local shapes of the portions of the cam faces upon which it is pressing. In this example, the plate spring 15 is made as two superimposed leaves. However, the number of superimposed leaves can be any number which is required to obtain the desired closing force.

Second Example of the Hinge Element

Figure 3:
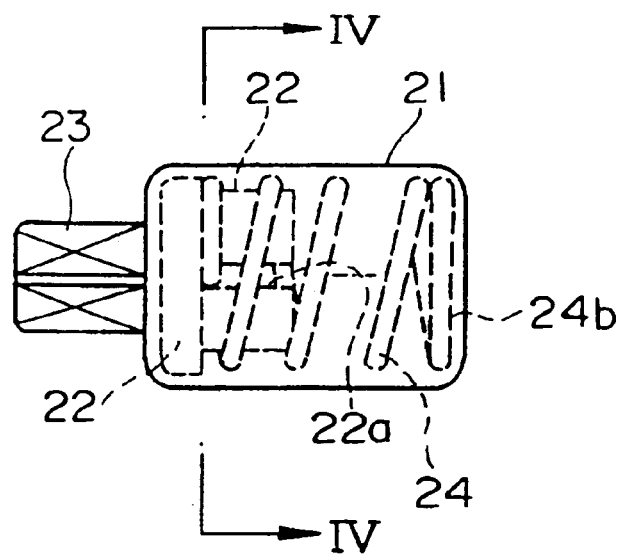
FIG. 3 is a front view showing a second example of a hinge element for the hinge device of the present invention.
Figure 4:
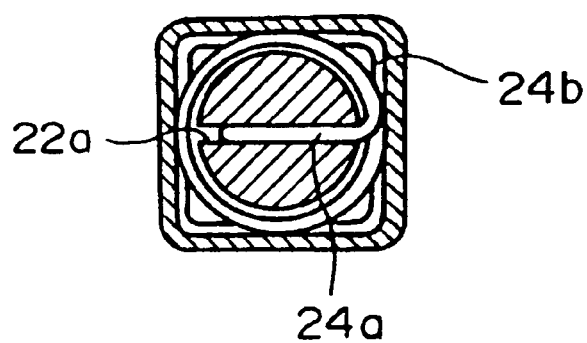
FIG. 4 is a sectional view of FIG. 3 as seen along the arrows IV—IV.

FIG. 3 and FIG. 4 show a second example of the hinge element. The hinge element 20 is constructed to comprise a casing 21, a block body 22, an axis body 23, a press-torsion spring 24, etc. In this case, the casing 21, the block body 22, the press-torsion spring 24 etc. constitute a hinge main body of the hinge element 20.

The casing 21 is formed roughly in a square tubular shape in order to be endowed with the function of preventing rotation, and is also formed with a protrusion hole (not shown in the figures) in its front side.

The block body 22 is received within the casing 21, and is made of a size greater than that of said protrusion hole so that it is impossible for it to come out from the casing 21. A stop concavity 22a is formed in the block body 22 and extends in a direction parallel with its rotational axis.

The axis body 23 is positioned at the front side of the block body 22, and is formed to be of a size which can protrude from said protrusion hole. The axis body 23 is formed in a roughly square post shape, so that idle turning should not occur.

One end 24a of the press-torsion spring 24 is engaged into the stop concavity 22a, and said spring 24, after being wound around the rotational axis by just a predetermined number of turns in a circular coil shape, is received within the casing 21 in the state of being wound into a square shape by two turns 24b at its rear side. By the two turns 24b at the rear end of the press-torsion spring 24 being formed in a square shape, these two turns 24b are engaged to the casing 21 so as not to be able to rotate with respect to the casing 21. The press-torsion spring 24 functions as a pressure spring which biases the block body 22 and the axis body 23 integrally forwards along their rotational axis. Furthermore the press-torsion spring 24, by its two ends being respectively engaged with the stop concavity 22a and the casing 21, functions as a torsion spring which, when the axis body 23 has been rotated around the rotational axis, is able to be twisted in accompaniment with this rotation so as to accumulate restoring force.

Here, to explain the opening and closing operation in the case that the hinge element 20 has been applied to a flip lid type portable electronic device, for example, the opened state of the flip lid with respect to the main body of the portable electronic device is set to the normal state of the press-torsion spring 24 in which said press-torsion spring 24 does not exert any torsion force.

When the flip lid is closed from this opened state and is put into the closed state, the press-torsion spring 24 is wound up, and the torsion force which accompanies this winding up is exerted as a restoring force upon the press-torsion spring 24. In other words the hinge element 20 is endowed with the function, with the flip lid in the closed position, of biasing the flip lid in the opening direction. In this manner, the hinge element 20 is endowed with a hinging function (an opening and closing function) of generating a restoring torque according to the twisted condition of the press-torsion spring 24.

First Embodiment of the Hinge Device

Figure 5:
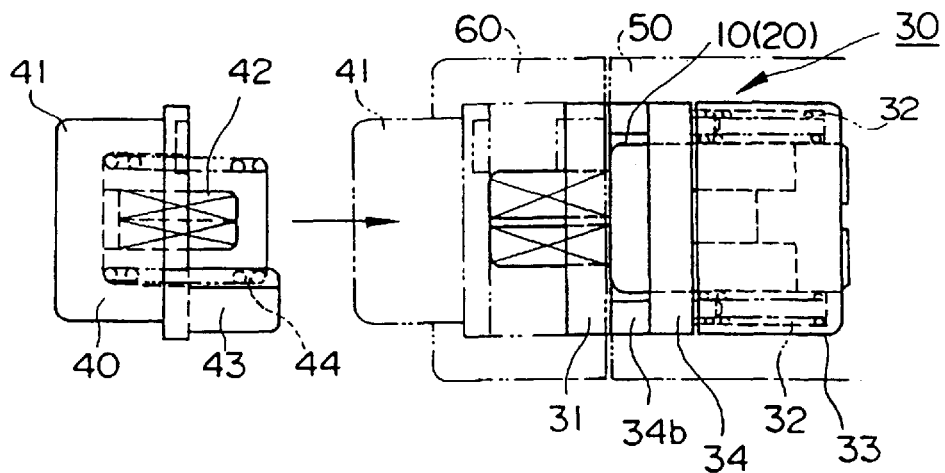
FIG. 5 is a plan view showing a first embodiment of the hinge device of the present invention.
Figure 6:
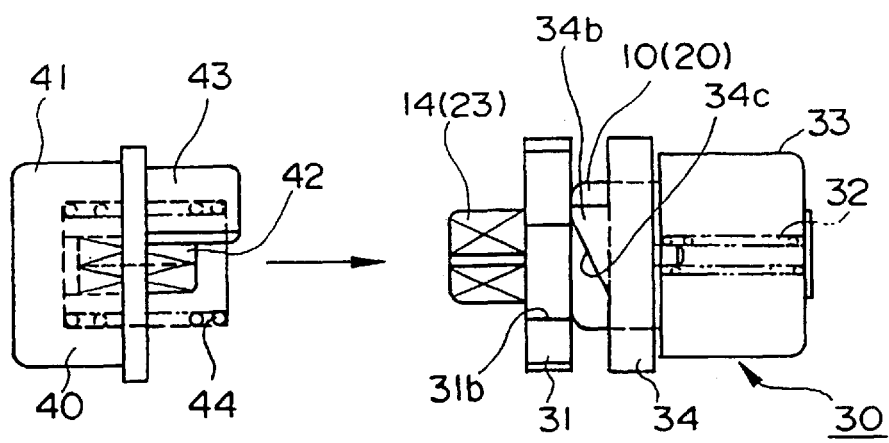
FIG. 6 is a front view showing the hinge device of FIG. 5.
Figure 7:
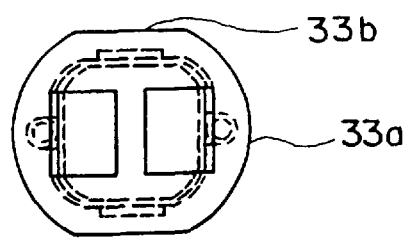
FIG. 7 is a right side view showing the hinge device of FIG. 5.

Next, referring to FIG. 5 through FIG. 7, a lock mechanism 30 and a lock release mechanism 40 in a first embodiment of the hinge device of the present invention will be explained. It should be understood that this lock mechanism 30 and lock release mechanism 40 can be applied to either of the hinge elements 10 and 20 described above.

The lock mechanism 30 is made so as to comprise a first lock member 31, a spring (biasing means) 32, a spring housing casing 33, a second lock member 34, etc.

Figure 8:
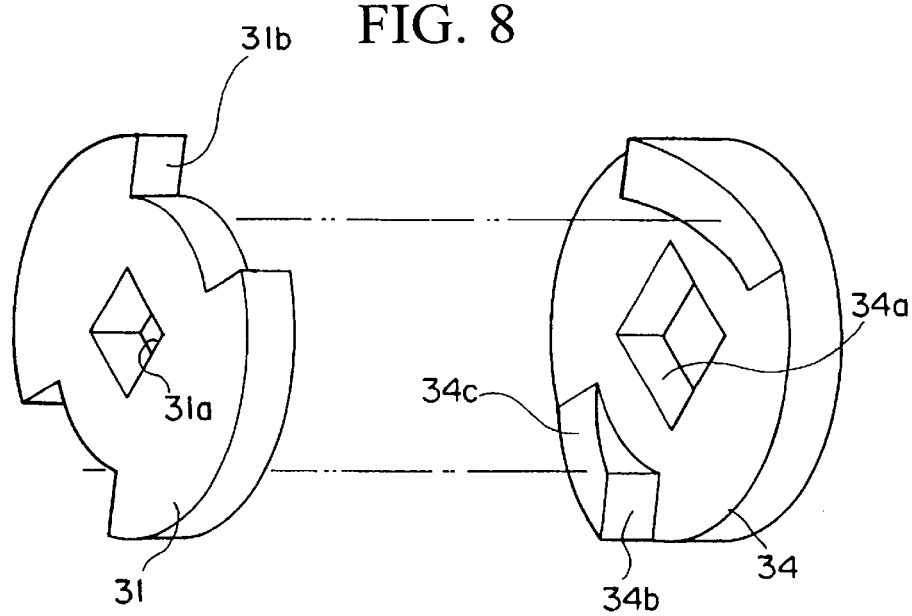
FIG. 8 is a magnified exploded perspective view showing a portion of a locking mechanism in the hinge device of the present invention.

The first lock member 31 is fixed to the axis body 14 (or 23) of the hinge element 10 (or 20) so as to be unable to rotate relatively thereto. In concrete terms, in the state with the axis body 14 (or 23) being inserted through a central hole 31a (shown in FIG. 8), it is fixed with respect to the axis body. An engagement cutaway (stopper portion) 31b is formed upon the first lock member 31 at its peripheral edge.

The spring housing casing 33 is arranged so as to enclose the periphery of the casing 11 (or 21) upon the hinge main body side of the hinge element 10 (or 20). The spring housing casing 33 has an external form which includes a circular portion 33a and a rotation prevention planar portion 33b, and is fixed with respect to the casing 11 (or 21). Two springs 32 are housed within the spring housing casing 33 on both the sides of the hinge main body.

The second lock member 34 is arranged so as to enclose the periphery of the casing 11 (or 21) on the hinge main body side of the hinge element 10 (or 20). The second lock member 34 is arranged so as to be incapable of relative rotational movement with respect to the casing by being inserted into the casing through a casing insertion hole 34a (shown in FIG. 8), and moreover is arranged so as to be movable in the axial direction by being biased by the springs 32 forwards along the axial direction (in other words, towards the first lock member 31). Furthermore, the second lock member 34 comprises an engagement body 34b which can engage with respect to the engagement cutaway 31b. In this case, the front side face of the engagement body 34b is formed as a sloping surface 34c.

The lock release mechanism comprises a push button 40. The push button 40 comprises a button portion 41, an engagement portion 42, a projection 43, a return spring 44, etc.

The engagement portion 42 is formed in a square tubular shape of dimensions smaller than the axis body 14 (or 23), and is fitted within an engagement aperture (not shown in the figures) which is formed at the end of the axis body 14 (or 23). By this fitting, the press button 40 is connected with respect to the axis body so as to rotate integrally with the axis body.

The projection 43 is made of a size and a shape which enable it to be inserted through the engagement cutaway 31*b*.

The return spring 44 is disposed within the push button 40, and biases the button portion 41 in the leftwards direction in the figure.

Next, the fitting to a flip lid type portable electronic device of the hinge device which is made up from the hinge element 10 or 20, the lock mechanism 30, and the lock release mechanism 40 structured as described above will be explained. Here, by way of example as a portable electronic device, a portable telephone device which is made up from a portable telephone device main body 50 and a flip lid 60 will be explained.

Figure 9:
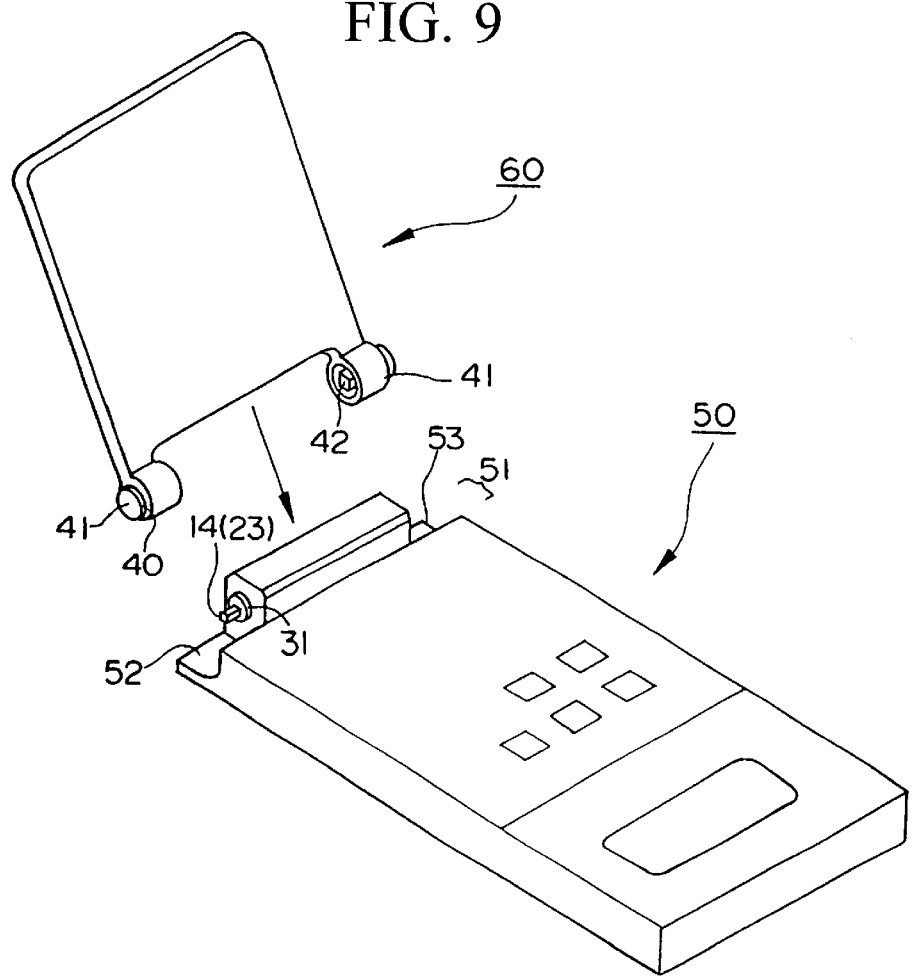
FIG. 9 is an exploded perspective view showing a portable telephone which utilizes the hinge device of the present invention.

First, as shown in FIG. 9, hinge main bodies are fitted to both end portions 52, 53 in the widthwise direction of a linking region 51 of the flip lid 60 with respect to the portable telephone device main body 50. The fitting of the hinge main bodies in this case, as shown in FIG. 5, is performed so that the axis bodies 14 (or 23) and the first lock members 31 are in a state of being protruded from the portable electronic device main body 50. By doing this, the hinge main bodies and the second lock members 34 (and the springs 32 etc.) are fitted integrally to the portable electronic device main body 50. In contrast to this, the axis bodies 14 (or 23) and the first lock members 31 are assembled on the side of the flip lid 60, as will be described hereinafter, so as to rotate integrally with the flip lid 60; in other words, they rotate relatively to the portable telephone device main body 50.

Figure 10:
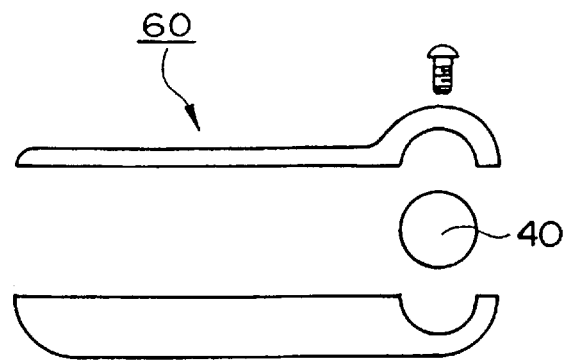
FIG. 10 is an exploded view showing an example of fitting a lock release mechanism of a flip lid in the hinge device of the present invention.

Further, the push buttons 40 are fitted so as not to be able to rotate relatively to the flip lid 60, and moreover so as to be able to act in the direction of the hinge main body. Although this type of fitting can be implemented in a variety of ways, to take one example thereof, as shown in FIG. 10, this may be performed by sandwiching the push buttons 40 between two portions into which the flip lid 60 is divided, and by engaging the ends of screws in longitudinal grooves (not shown in the figures) which are formed in the button portions 41. In this case, the push buttons 40 are unable to rotate relatively to the flip lid 60 due to the ends of the screws being engaged in the longitudinal grooves, while they can act towards the hinge main body by the ends of the screws being able to shift along the longitudinal grooves in the direction towards the hinge main body. In the state in which the push buttons 40 are assembled to the flip lid 60, as shown in FIG. 5, the button portions 41 project from the outer surfaces of the flip lid 60. By fitting the push buttons 40 to the flip lid 60 in this manner, the axis bodies 14 (or 23) and the first lock members 31 come to be fitted to the side of the flip lid 60.

This type of fitting is performed as the last stage of assembly. In other words, after the hinge main bodies have been fitted to the portable telephone device main body 50, it is done by pushing the engagement portions 42 of the push buttons 40 into the engagement apertures (not shown in the figures) of the axis bodies 14 (or 23). By this, the assembly of the portable telephone device is completed.

Next, the opening and closing operation of the flip lid 60 with respect to the portable telephone device main body 50 will be explained. As has been described previously, it is possible to use either of the hinge elements 10 and 20 for the present invention. Accordingly, the three cases will be separated and explained:

(A) the case where hinge devices which comprise hinge elements 10 are used at both of the end portions 52, 53 in the widthwise direction of the linking region 51;

(B) the case in which hinge devices which comprise hinge elements 20 are used at both of the end portions 52, 53 in the widthwise direction of the linking region 51; and (C) the case in which a hinge device which comprises a hinge element 10 is used at one of the end portions 52, 53 in the widthwise direction of the linking region 51, and moreover a hinge device which comprises a hinge element 20 is used at the other.

In all of these cases, the fact is common that that the closed state of the flip lid 60 with respect to the portable telephone device main body 50 is set to the locked state of the lock mechanism 30.

(A) The case in which two hinge elements 10 are used.

[A-1] The closed state

Figure 11A:
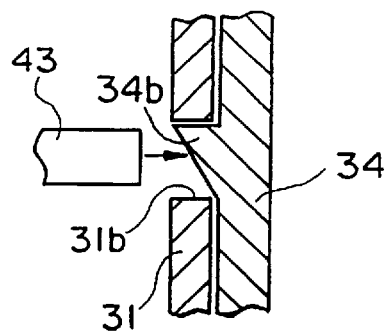
FIG. 11A is an explanatory figure showing the operation of the locking mechanism in the hinge device of the present invention.

In the closed state, as shown in FIG. 11A, the locked state is attained in which the engagement bodies 34*b* have been engaged into the engagement cutaways 31*b*. This locked state is stably maintained by the biasing force of the springs 32, as long as the push buttons 40 are not pressed. Furthermore in this closed state the flip lid 60 is further biased in the closing direction, based upon the torque characteristic of the hinge element 10. Due to this, it is possible to prevent rattling of the flip lid 60 in the opening direction, and further the flip lid 60 is prevented from floating up in the opening direction, which would be undesirable.

[A-2] From closed state to open state

Figure 11B:
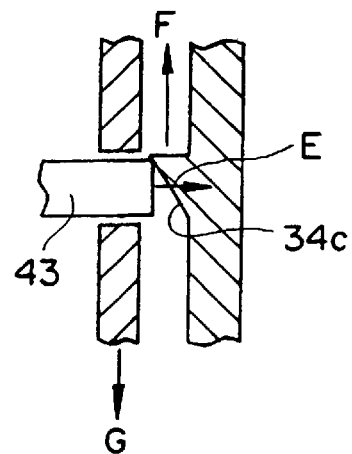
FIG. 11B is an explanatory figure showing the operation of the lock release mechanism.

To open the flip lid 60 from the closed state, the button portions 41 on both sides are pressed inwards. Due to this, as shown in FIG. 11B, the projections 43 are pressed inwards, and in accompaniment with this the engagement bodies 34*b* of the second lock members 34 are pressed inwards against the resistance of the biasing force of the springs 32. Due to this, the engagement between the engagement bodies 34*b* and the stopper portions 31*b* is released.

In this case, due to the end surfaces of the engagement bodies 34*b* being made as the sloping surfaces 34*c*, the pressing in forces E of the projections 43 are converted into shifting forces F of the engagement bodies 34*b* in the sidewise direction by being guided upon the sloping surfaces 34*c*. Actually, due to the second lock members 34 being assembled on the side of the portable telephone device main body 50 which has a large mass, shifting forces G of the projections 43 in the sidewise direction are generated as the reaction to these forces F. These forces G act as rotational forces upon the push buttons 40. In other words, rotational forces in the opening direction act upon the flip lid 60.

By doing this and obtaining this kind of initial rotational force in the opening direction, the biasing force in the closing direction due to the hinge elements 10 is overcome, and it is possible to open the flip lid 60 in a one-touch manner. For this objective, it is desirable to set the progressive angle á of the cam surfaces 12 to be comparatively small, such as for example to 5° to 15°. By doing this, the flip lid 60 is at one stroke and moreover automatically shifted through the opening angle â to the opened state.

It should be noted that, after the pushing forces are released, the push buttons 40 are returned to their original projecting states due to the action of the return springs 44 (the same holds for the cases (B) and (C) below as well).

[A-3] The open state

In the open state, the flip lid 60 is stably maintained at the opening angle â based upon the torque characteristics of the hinge elements 10.

[A-4] From open state to closed state

To close the flip lid 60 from the open state, the flip lid 60 is closed as far as the shift angle á. When the shift angle á is passed, the closed state is attained due to the biasing force of the hinge elements 10, and simultaneously locking is performed by the lock mechanism 30.

(B) The case in which two hinge elements 20 are used.

[B-1] The closed state

In the closed state, the locked state is attained by the lock mechanism 30 in the same manner as described above, and is stably maintained due to the biasing forces of the springs 32. Furthermore, in this closed state, the hinge elements 20 impart biasing force in the opening direction to the flip lid 60, based upon the torque characteristics of the hinge elements 20.

[B-2] From closed state to open state

To open the flip lid 60 from the closed state, the button portions 41 on both sides are pressed inwards. By doing this, the locking is released in the same manner as described above. In this case, based upon the torque characteristics of the hinge elements 20, it is possible to obtain an initial opening force, due to the biasing force in the opening direction of these hinge elements 20 (without relying upon any force conversion mechanism by the sloping surfaces 34*c*).

By obtaining initial rotational force in the opening direction by doing this, it is possible to open the flip lid 60 in a one-touch manner. Due to this, the flip lid 60 is at one stroke and moreover automatically shifted to the opened state.

[B-3] The open state

In the open state, the flip lid 60 is maintained in the open state, and no torque is generated in the press-torsion springs 24, since no twisting is engendered in the press-torsion springs 24.

[B-4] From open state to closed state

To close the flip lid 60 from the open state, the flip lid 60 is closed as far as the closed state. By doing this, locking is performed by the lock mechanism 30.

(C) The case in which a hinge element 10 is used on one side and a hinge element 20 is used at the other side

[C-1] The closed state

In the closed state the locked state is attained by the lock mechanism 30, in the same manner as described above, and is stably maintained by the biasing force of the springs 32. Furthermore in this closed state the flip lid 60 is further biased in the closing direction, based upon the torque characteristic of the single hinge element 10, so that it is possible in the same manner to prevent rattling of the flip lid 60 in the opening direction and floating up of the flip lid 60.

[C-2] From closed state to open state

To open the flip lid 60 from the closed state, the button portions 41 on both sides are pressed inwards. Due to this, the lock is released in the same manner as described above. In this case, based upon the torque characteristics of the other hinge element 20, it is possible to obtain an initial opening force, due to the biasing force in the opening direction of this hinge element 20 (without relying upon any force conversion mechanism by the sloping surface 34*c*).

By obtaining an initial opening rotational force by doing this, it is easy to overcome the biasing force in the closing direction due to the hinge element 10. Accordingly, it is possible to open the flip lid 60 in a one-touch manner. Due to this, the flip lid 60 is at one stroke and moreover automatically shifted to the open state through the opening angle â.

[C-3] The open state

In the open state the flip lid 60 is stably maintained at the opening angle â based upon the torque characteristic of the single hinge element 10.

[C-4] From open state to closed state

To close the flip lid 60 from the open state, the flip lid 60 is closed as far as the closed state. By doing this, locking is performed by the lock mechanism 30. In this case, although the biasing force of the other hinge device 20 becomes large as it closes, the increase in the magnitude of the biasing force of the hinge element 20 comes to be reduced, due to the fact that the biasing force of the first hinge element 10 changes towards the closing direction when it passes a shift angle (for example 30°).

To compare these three cases, the case (C) is the most desirable one, due to the fact that it is possible to prevent floating up and rattling of the flip lid 60 in the closed state, the fact that initial opening force is easily obtained, and the fact that the stability of maintenance in the open state is high.

Second Embodiment of the Hinge Device

Figure 12A:
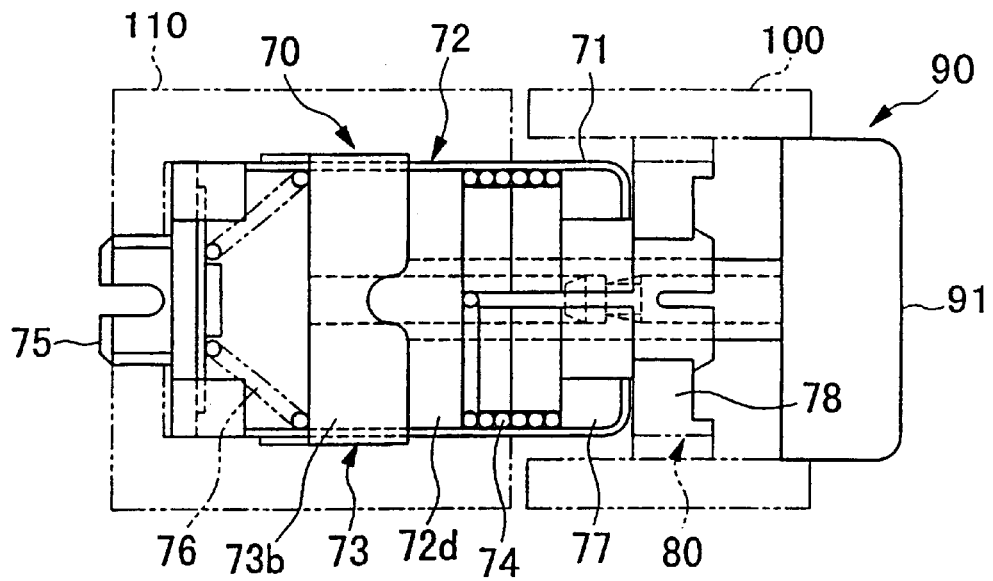
FIG. 12A is an explanatory figure showing the operation of the locking mechanism in a second embodiment of the hinge device of the present invention.
Figure 12B:
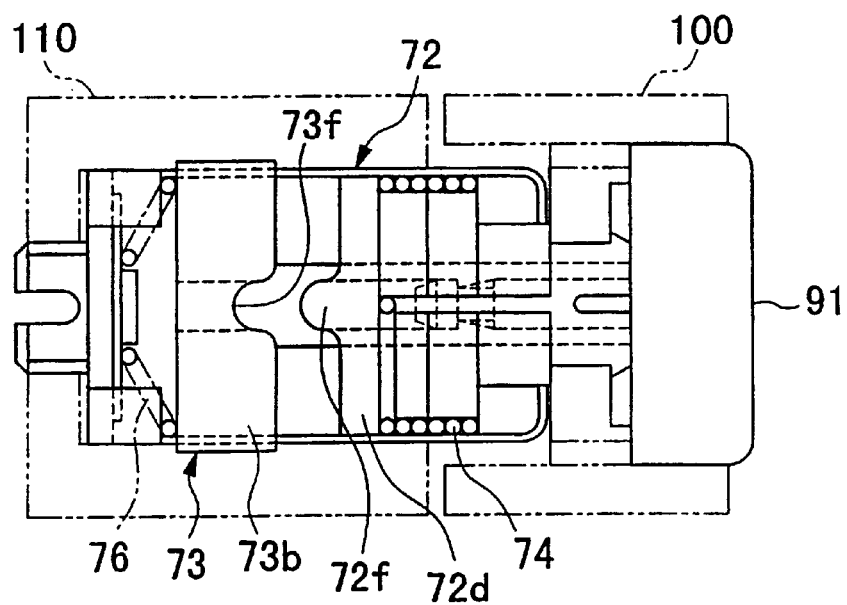
FIG. 12B is an explanatory figure showing the operation of the lock release mechanism.

FIGS. 12A and 12B show a second embodiment of the hinge device. This hinge device is made to comprise a hinge element 70, a lock mechanism 80, and a lock release mechanism 90. Furthermore, the hinge element 70 comprises a casing 71, a click cam (axis body) 72, a slide click cam (second lock member) 73, a torque spring 74 etc., and the hinge main body comprises the casing 71, the torque spring 74, etc.

Figure 13:
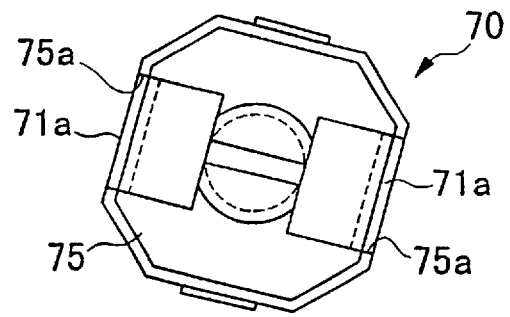
FIG. 13 is a left side view showing the hinge device of FIG. 12.
Figure 14:
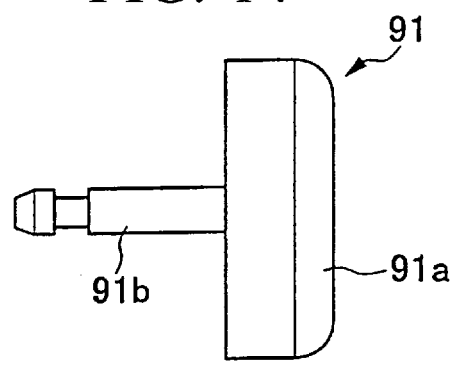
FIG. 14 is a front view showing a push button of the hinge device of FIG. 12.

The casing 71 is formed in a generally square tubular shape with a bottom so as to be endowed with the function of stopping rotation, and its opening end is closed over with a fastener 75. Furthermore, a projection hole is coaxially formed in the bottom end of the casing 71, and a rear end portion 72*a* of the click cam 72 is inserted into this projection hole. On the other hand, a pair of insertion cutaways are formed on the peripheral surface of the opening end side of the casing 71, and it can be engaged to a flip lid (a first assembly member) by engagement protrusions 73*e* of the slide click cam 73 being inserted into these insertion cutaways. Moreover, at the opening end of the casing 71, a pair of fastener engagement protrusions 71*a* are formed so as to project extending along the axial direction, and these fastener engagement protrusions 71*a* are engaged into engagement cutaways 75*a* which are formed upon the peripheral surface of said fastener 75 (refer to FIG. 13).

Figure 16:
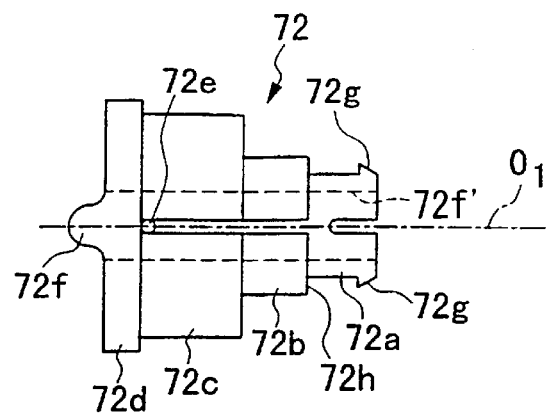
FIG. 16 is a front view showing a click cam of the hinge device of FIG. 12.
Figure 17:
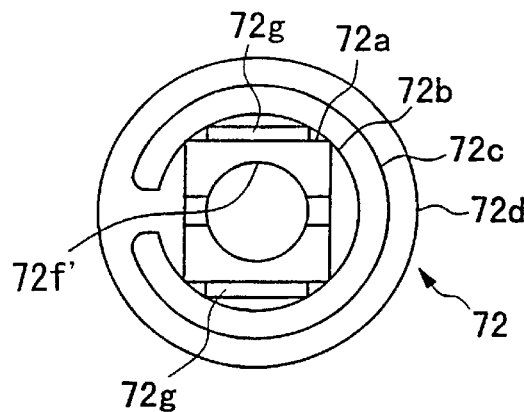
FIG. 17 is a right side view showing the click cam of FIG. 16.
Figure 18:
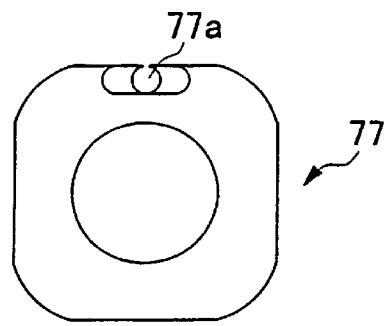
FIG. 18 is a plan view showing a spring holder of the hinge device of FIG. 12.

The click cam 72 is made in the form of a stepped tube, as shown in FIG. 16, and it is constructed to comprise a rear end portion 72*a*, a first central portion 72*b*, a second central portion 72*c*, and a cam portion 72*d*, which are formed so as to be of increasing radius in order from its one end in the direction towards its other end. This click cam 72 is received coaxially within the casing 71 so that the rear end portion 72*a* which has a square post shape and the first central portion 72*b* which has a cylindrical post shape project to the exterior of the casing 71 from said projection hole.

A fixing hole 72*e*, which extends in the direction perpendicular with respect to the rotational axis O1 of the click cam 72, is formed in the second central portion 72*c*, which has a cylindrical post shape.

An engagement convex portion 72*f* which projects along the rotational axis O1 and moreover extends in a radial direction is formed upon the front end surface of the cam portion 72*d* which has a circular plate shape, and this engagement convex portion 72*f* is able to enter into concave and convex engagement with the slide click cam 73. The tip end portion of the engagement convex portion 72*f* is formed as a sloping surface having a circular arcuate shape in vertical section.

A through hole 72*f'* is formed in the click cam 72 and extends coaxially along its rotational axis O, and an axis portion 73*a* of the slide click cam 73 is passed through this through hole 72*f'*.

Figure 19:
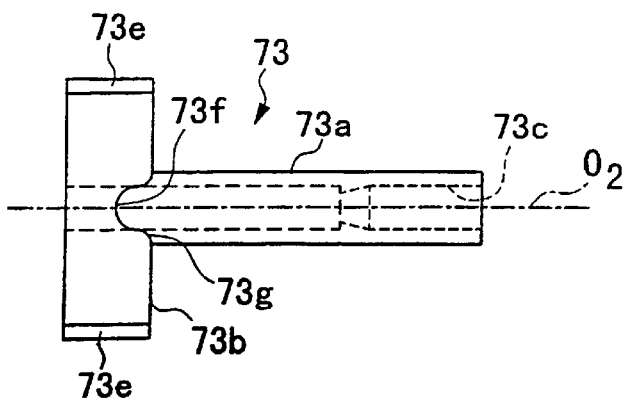
FIG. 19 is a front view showing a slide click cam of the hinge device of FIG. 12.
Figure 20:
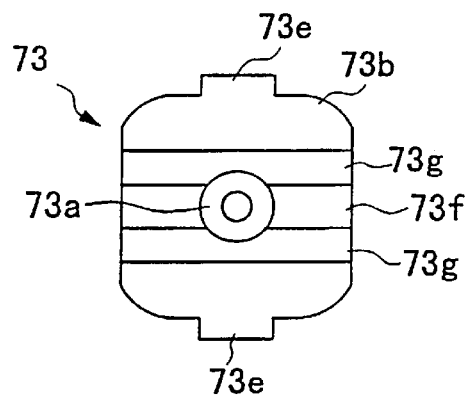
FIG. 20 is a right side view showing the slide click cam of FIG. 19.

The slide click cam 73, as shown in FIG. 19 and FIG. 20, is formed to comprise the axis portion 73*a* and a cam portion 73*b*.

The axis portion 73a, when inserted in the through hole 72f of the click cam 72, is of a length dimension which projects more than said rear end portion 72a. Furthermore, a stepped through hole 73c is coaxially formed in the axis portion 73a, and an axis portion 91b of a push button 91 is pressed in and fixed into in its rear end portion.

The cam portion 73b comprises upon its outer periphery engagement protrusions 73e which passes through a through cutaway of said casing 71 and is engaged to a flip lid 110, and, in the state in which these engagement protrusions 73e are engaged to engagement cutaways, on the one hand rotational movement around the axis O2 relative to the casing 71 is prevented, while forward and backward shifting along the axis O2 is permitted.

Upon the rear end surface of the cam portion 73b an engagement concave portion 73f which is dented in along the axis O2 is formed so as to extend along a direction perpendicular thereto, and this engagement concave portion 73f is made to be capable of convex and concave engagement with the engagement convex portion 72f. Furthermore, the opening portion of the engagement concave portion 73f is made as a sloping surface 73g of circular arcuate shape in vertical section.

A compression spring 76 is disposed between the front end surface of the cam portion 73b and said fastener 75, and the slide click cam 73 is always biased by this compression spring 76 along the axis O2 to the rearwards side, in other words to the side of the click cam 72.

One end of the torque spring 74 is inserted in the fixing hole 72e so as to be fixed therein, and, after it has been wound in circular coil form by just a predetermined number of turns around the rotational axis O1 around the second central portion 72c of said click cam 72, it is disposed within the casing 71 in the state of being fixed in a fixing hole 77a of a spring holder 77 which is fitted over the outside of the first central portion 72b of said click cam 72. On the one hand the inner periphery of this spring holder 77 is formed as a circular tube and permits rotational movement of the first central portion 72b of the click cam 72, while its outer periphery is formed as a roughly square shaped plate so that its own rotational movement within the casing 71 is prevented.

Accordingly, due to the fact that the two ends of the torque spring 74 are respectively fixed into the fixing hole 72e of the click cam 72 and the fixing hole 77a of the spring holder, it can be twisted so as to store restoring force when the click cam 72 is rotationally moved around the rotational axis O1 as a center, and thus it functions as a torsion spring.

Here, to explain the opening and closing operation when the hinge element 70 is applied to a flip lid type portable electronic device, for example, in the open state of the flip lid with respect to the portable electronic device main body, the torque spring 74 is set to the state in which it is not storing up any twisting force.

When from this type of open state the flip lid is progressively closed to the closed state, the torque spring 74 is wound up, and the twisting force which accompanies this winding up is stored as a restoring force in the torque spring 74. In other words, with the flip lid in the closed position, the hinge element 70 is endowed with a function of biasing the flip lid in the opening direction.

In this manner, the hinge element 70 is endowed with a hinging function (an opening and closing function) of generating restoring torque in correspondence with the twisted condition of the torque spring 74.

Next, the lock mechanism 80 and the lock release mechanism 90 which are applied for the above described hinge element 70 will be explained with reference to FIGS. 12A and 12B.

In FIGS. 12A and 12B, the lock mechanism 80 is constituted by the cam guide place 78 (the first lock member), the cam portion 72d of the click cam 72, the cam portion 73b of the slide click cam 73, and the compression spring 76 etc., and furthermore the lock release mechanism 90 is constituted by the push button 91.

Figure 15:
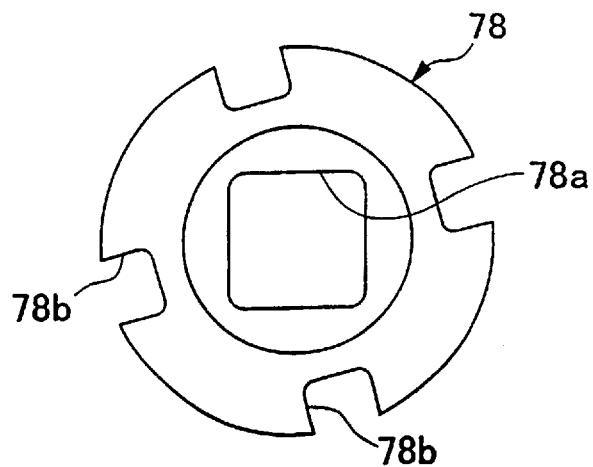
FIG. 15 is a plan view showing a cam guide plate of the hinge device of FIG. 12.

The cam guide plate 78, as shown in FIG. 15, is fitted so as not to be capable of relative rotational movement with respect to the rear end portion 72a of the click cam 72 which is one structural element of the hinge element 70. To explain this in concrete terms, by inserting the square post shaped rear end portion 72a into the central square aperture 78a of the cam guide plate 78, relative rotational movement between the two of them is prevented. Furthermore, engagement cutaways 78b are formed at intervals of 90° around the periphery of the cam guide plate 78.

A pair of removal prevention latches 72g are formed in the rear end portion 72a of the click cam 72, and coming out in the rearwards direction along the rotational movement axis of the cam guide plate 78 is implemented for the rear end portion 72a by these removal prevention latches 72g. It should be understood that coming out in the forwards direction along the rotational movement axis of the click cam 72 is implemented by the cam guide plate 78 contacting the bottom surface of the casing 71, and coming out in the rearwards direction along the rotational movement axis of the click cam 72 is implemented by the stepped portions 72h of the first central portion 72b and the second central portion 72c contacting the spring holder 77.

The cam portion 72d of the click cam 72 and the cam portion 73b of the slide click cam 73, as described above, are respectively capable of concave and convex engagement with the engagement convex portion 72f and the engagement concave portion 73f, and, in the state in which these click cam 72 and slide click cam 73 are engaged by concave and convex engagement, relative rotation of the two of them is prevented. This concave and convex engagement state, as described above, is implemented by the cam portion 73b of the slide click cam 73 being pressed against the cam portion 72d of the click cam 72 due to the elastic force of the compression spring 76 which is disposed between said fastener 75 and the slide click cam 73.

The lock release mechanism 90 is constituted by the push button 91 which is made up from the push button portion 91a and the axis portion 91b. The push button 91 is made to be unitary with the slide click cam 73 by this axis portion 91b being pressed into the axis portion 73a of the slide click cam 73. Accordingly, the push button 91 is always biased via the slide click cam 73 in the reverse direction to the button pressing in direction (in FIGS. 12A and 12B, the leftwards direction) due to said compression spring 76.

Next, the fitting of the hinge device which is made up from the hinge element 70, the lock mechanism 80, and the lock release mechanism 90 to the flip lid type portable electronic device will be explained. Here as well, for the portable electronic device, the explanation will take as an example a portable telephone device which is made up from a portable telephone device main body (second assembly member) 100 and a flip lid (first assembly member) 110.

Figure 21:
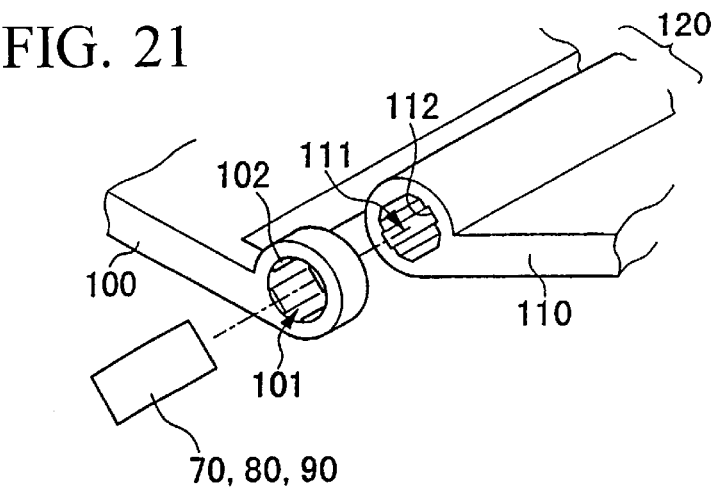
FIG. 21 is an exploded perspective view showing an example of fitting the hinge device of FIG. 12 to a portable telephone.

In the hinge device, as shown in FIG. 21 (a simplified figure showing the hinge device), the hinge main body is fitted at one end portion of a linking region 120 between the portable telephone device main body 100 and the flip lid 110, so as to impart the flip lid 110 with a predetermined standing up angle from the same plane as the portable telephone device main body 100. The standing up angle at this time is the angle when the flip lid 100 is in the open state, and may for example be set to 20° as shown at position A in FIG. 22.

The fitting of the hinge device to the flip lid 110 is performed by engaging the engagement protrusions 73e of the cam portion 73b on the slide click cam 73 to concave engagement grooves 112 in a fitting aperture 111. When this is done, the hinge device is integrally fitted via the slide click cam 73 to the flip lid 110 so that the hinge main body becomes incapable of relative rotation with respect thereto.

At this time, the cam guide plate 78 which is integrally fixed to the rear end portion 72a of the click cam 72 is housed in a fitting aperture 101 on the side of the portable telephone device main body 100, and the engagement cutaways 78b which are formed upon the outer periphery of the cam guide plate 78 are engaged to engagement convexities 102 which are provided within the fitting aperture 111. When this is done, the click cam 72 is integrally fitted via the cam guide plate 78 to the portable telephone device main body 100 so as to be incapable of relative rotation with respect thereto.

Since by the above, with on the one hand the rear end portion 72a of the click cam 72 and the cam guide plate 78 being assembled upon the side of the portable telephone device main body 100 and being integrally fixed so as to be incapable of relative rotation with respect to said portable telephone device main body 100, this click cam 72 upon the side of the flip lid 110 is freely ?? rotatably housed within the casing 71 which rotates integrally together with said flip lid 110, in the state in which a hinge device like that described above is assembled to the linking region 120, the flip lid 110 and the portable telephone device main body 100 are linked together so as to be capable of relative rotation.

Next, the opening and closing operation of the flip lid 110 with respect to the portable telephone device main body 100 will be explained. Here, the explanation will be made for the case that a hinge device which comprises a hinge element 70 has been assembled to a single end portion in the widthwise direction of the linking region 120.

[D-1] The closed state

In the closed state, as shown in FIG. 12A, a locked state is attained in which the engagement concave portion 73f of the cam portion 73b on the slide click cam 73 and the engagement convex portion 72f of the cam portion 72d on the click cam 72 are engaged together by concave and convex engagement. This type of locked state is stably maintained by the biasing force of the compression spring 76, provided that the push button 91 is not pressed.

Furthermore, in this closed state, the hinge element 70 imparts biasing force based upon its torque characteristic to the flip lid 110 in the opening direction. To explain in concrete terms, when the click cam 72 and the slide click cam 73 have been put into concave and convex engagement, in other words when the flip lid 110 is positioned at the positions A, A' in FIG. 22, the torque spring 74 is just in the state of not storing up any twisting force. Accordingly, in the state shown by the position C in which the flip lid 110 is closed, the torque spring 74 comes to be in the state of being twisted by just the phase amount (in FIG. 22, 20°) by which it differs from the position A', and thus imparts biasing force in the opening direction to the flip lid 110.

[D-2] From closed state to open state

To open the flip lid 110 from the closed state, the push button 91 is pressed in towards the inside. By doing this, only the slide click cam 73 is pressed in against the resistance force of the compression spring 76, with the click cam 72 being maintained at its original position, as shown in FIG. 12B. Due to this, the concave and convex engagement between the engagement concave portion 73 of the cam portion 73b on the slide click cam 73 and the engagement convex portion 72f of the cam portion 72d on the click cam 72 is released.

In this case the flip lid 110 opens at one touch, since the flip lid 110 is imparted with initial opening force due to the biasing force in the opening direction based upon the torque characteristic of the hinge element 70. In other words, by pressing force being imparted to the push button 91, the flip lid 110 comes to shift snappily and moreover automatically to the open state.

Figure 22:
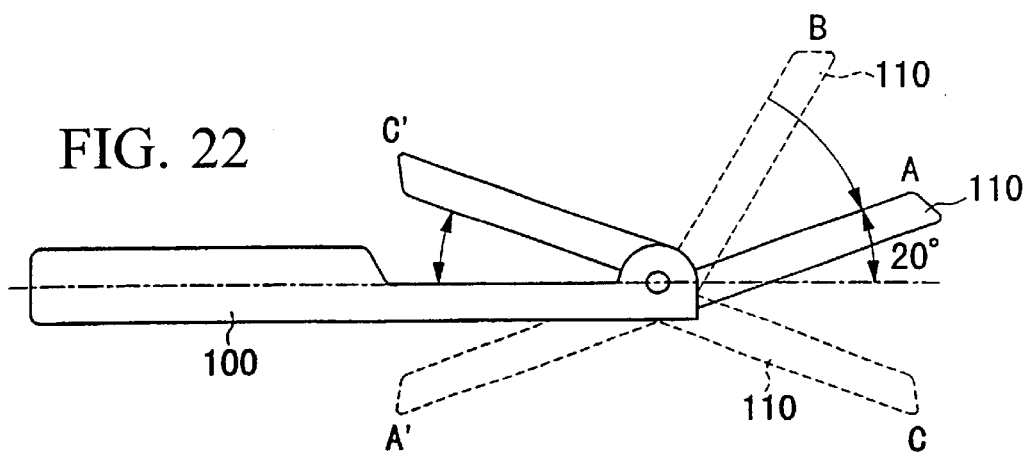
FIG. 22 is an explanatory figure showing the opening and closing operation of a portable telephone in which is comprised the hinge device of FIG. 12.

Furthermore, in the process of shifting from the closed state to the open state, since based upon the torque characteristic of the coil spring 74 biasing force acts upon the flip lid 110 which is positioned in the position B or the position C of FIG. 22 to restore it to the state of being in the position A, thereby quick and moreover accurate position determination of the flip lid 110 is performed.

When the pressing force upon the push button 91 is released, the push button 91 returns to its original projecting state along with the slide click cam 73 due to the action of the compression spring 76. When this is done, the engagement concave portion 73f of the slide click cam 73 and the engagement convex portion 72d of the click cam 72 engage together by concave and convex engagement.

When establishing this concave and convex engagement, as the convex engagement portion 72f approaches relatively to the engagement concave portion 73f and engages to the sloping face 73g of said concave engagement portion 73f, the convex engagement portion 72f is guided along this sloping face 73g into the concave engagement portion 73f. Accordingly, the concave and convex engagement operation of the convex engagement portion 72f and the concave engagement portion 73f when shifting from the closed state to the open state becomes smooth.

[D-3] The open state

In the open state shown by the position A of FIG. 22, no torque is generated in the torque spring 74, since no twisting is imparted to the torque spring 74. Accordingly, the flip lid 110 is stably maintained in the open state.

[D-4] From open state to closed state

To close the flip lid 110 from the open state, the flip lid 110 is manually folded back until it reaches the closed state. Due to this, locking is performed by the lock mechanism 30.

It should be understood that, in this embodiment, the fact that the torque characteristic of the slide click cam 73, and the lock mechanism 80 and the lock release mechanism 90, are not implemented using a press-twisting spring which has the functions of both the torque spring 74 and the compression spring 76, but rather are separately implemented using the torque spring 74 and the compression spring 76, is due to the following reasons.

That is to say, this is because, if these functions were implemented by the use of a press-twisting spring, then the life of the spring would be shortened (which would be undesirable), since both twisting reaction force and compression reaction force would act upon the spring at the same time. Furthermore, it is because balance adjustment of the compression force and the twisting force which were generated due to a press-twisting spring would be difficult, and when the twisting force which was generated was greater than the compression force, then the lock mechanism 80 would not function properly, and the flip lid would always be in the open state (which would be undesirable).

It should be understood that the present invention is not limited to the above described embodiments; the following embodiments are also possible:

a) Instead of applying the hinge device according to the present invention to a portable electronic device, to apply it to any general device, without consideration of whether it is a portable type device or is a device other than a portable one, and further without consideration of whether or not it is an electronic device.

b) Instead of applying the hinge device according to the present invention to the flip lid and the main body in a portable telephone device, to apply it to the flip lid and the main body in any of various types of portable electronic device, such as a portable computer, an electronic notebook, an electronic game machine, or the like.

c) Instead of using the hinge elements 10, 20, and 70, to employ a hinge element having any arbitrary torque characteristic, or to use a combination thereof.

d) To include a lock mechanism or a lock release mechanism other than the ones shown as examples in the figures.

e) Instead of incorporating the hinge main body on the side of the portable electronic device main body and incorporating the axis body on the side of the flip lid, to utilize a reversed method of assembly. Accordingly, the term "first assembly member" mentioned in Claim 2 could refer to the portable electronic device main body, or could refer to the flip lid. Corresponding to this, the term "second assembly member" could refer to the flip lid, or could refer to the portable electronic device main body.

f) Instead of using the shapes shown in the figures for the axis body 14, 23 of the hinge element 10, 20 and of the click cam 72 of the hinge element 70, to use any shapes.

g) Instead of using the shape of the cam 21 shown in FIG. 2, and instead of using the shapes of the cam portions 72d and 73b shown in FIGS. 12A and 12B, to use any other cam shapes.

h) Instead of using hinge devices according to the present invention which are provided with lock mechanisms and lock release mechanisms at both of the end portions 52, 53 in the widthwise direction of the linking region 51, to use only a single hinge device according to the present invention at one end, and to use a hinge device of a conventional type having no lock mechanism at the other end. In this case, the portable electronic device would become a one-button type having a single lock release button. Actually, the two button type having lock release buttons on both sides like the ones of the above described embodiments is preferable, from the point of view that erroneous operation due to unintentional pressing force is prevented. Furthermore it would be possible, instead of using a hinge device according to the present invention having a lock mechanism 80 and a lock release mechanism 90 only at a single end portion in the widthwise direction of the linking region 120, to use various combinations of hinge device according to the present invention at both the end portions in the widthwise direction of the linking region 120.

INDUSTRIAL APPLICABILITY

The present invention relates to a hinge device for implementing a hinged linkage. Furthermore, it relates to a portable electronic device to which this type of hinge device is assembled.

According to the hinge device of the first aspect of the present invention, by the hinge device including a lock mechanism and a lock release mechanism in addition to the hinge element, it is not necessary to provide any separate lock mechanism or lock release mechanism for opening and closing on the side of a device to which this hinge device is applied, and it is possible to attain increased simplification and reduction of space of the device.

According to the hinge device of the second aspect, the hinge main body is assembled to the first assembly member and moreover the axis body is assembled to the second assembly member, then, by having a torque characteristic, during locking, such as to bias the first and second assembly members in the direction to mutually contact one another, it is possible to prevent the first and second assembly member from uselessly rattling together.

According to the hinge device of the third aspect, the hinge main body is assembled to the first assembly member and moreover the axis body is assembled to the second assembly member, then, by having a torque characteristic, at the moment that the locking by the lock mechanism has been released by the lock release mechanism, such as to rotate the first and second assembly members in the direction to mutually separate from one another, thereby the opening action of the first and second assembly members can be performed with a so-called one-touch action by driving the lock release mechanism.

According to the hinge device of the fourth aspect, it is possible to provide the lock function simply by implementing the lock function of the lock mechanism by concave and convex engagement of the first and the second lock members.

According to the hinge device of the fifth aspect, it is possible to perform maintenance of the engagement of the engagement body with respect to the stopper portion by the biasing means.

According to the hinge device of the sixth aspect, by forming the surface upon the engagement body which is pushed in by the projection as a sloping surface, thereby the pushing in force of the projection is converted into a shift force in the sideways direction of the projection and also is converted into a rotational force of the push button. When the hinge main body is assembled to the first assembly member and the axis body is assembled to the second assembly member, at the time of lock release, it is possible to take advantage of this rotational force as mutual separation force for the first and the second assembly members from one another, and it is possible to assist the opening operation of the first and the second assembly members.

According to the hinge device of the seventh aspect, it is possible to provide the lock function even more simply by implementing the lock function of the lock mechanism by concave and convex engagement of the axis body and the second lock member.

According to the hinge device of the eighth aspect, it is possible to perform maintenance of the concave and convex engagement of the axis body and the second lock member by the biasing means.

According to the hinge device ninth embodiment, when the engagement convex portion approaches relatively to the concave engagement portion and impinges upon a sloping portion of the concave engagement portion, the convex engagement portion is guided along the sloping portion of the concave engagement portion into the concave engagement portion. Accordingly, the operation during concave and convex engagement becomes smooth.

According to the portable electronic device of the tenth embodiment, by linking the portable electronic device main body and the flip lid via the above described type of hinge device, it is not necessary to provide any separate lock mechanism or lock release mechanism for opening and closing to the portable electronic device main body or to the flip lid, and it is possible to attain simplification and reduction of space of the portable electronic device.

According to the portable electronic device of the eleventh aspect, along with linking the portable electronic device main body and the flip lid via a hinge device according to the second aspect, by locking with the lock mechanism in the closed state of the flip lid with respect to the portable electronic device main body, in the closed state of the flip lid, the flip lid is biased in the further closing direction with respect to the portable electronic device main body based upon the torque characteristic of the hinge element. Due to this, it is possible to prevent rattling of the flip lid in the opening direction. Moreover, it is possible to prevent floating up of the flip lid in the closed state. According to the portable electronic device described in the second aspect, along with linking the portable electronic device main body and the flip lid via a hinge device according to the third aspect, by locking with the lock mechanism in the closed state of the flip lid with respect to the portable electronic device main body, at the instant that the locking is released, it is possible for the flip lid to open up away from the portable electronic device main body based upon the torque characteristic of the hinge element. In other words, the opening operation of the flip lid from the portable electronic device main body can be performed by so-called one-touch lock release operation.

What is claimed is:

1. A hinge device comprising:
a hinge element which has an axis body and a hinge main body and which is constructed so that said axis body possesses a predetermined torque characteristic around a rotational axis with respect to said hinge main body;
a lock mechanism which functions so as to lock rotational movement of said axis body around the rotational axis; and
a lock release mechanism which releases locking by said lock mechanism wherein
said lock mechanism comprises a first lock member which is provided on the side of said axis body so as to be unable to move rotationally relative to said axis body, and a second lock member which is provided on the side of said hinge main body so as to be unable to move rotationally relative to said hinge main body;
said first lock member comprises a stopper portion;
said second lock member comprises an engagement body which can engage with respect to said stopper portion, and which is biased in the direction towards said first lock member by a biasing means;
said lock function by said lock mechanism is provided by said engagement body engaging into said stopper portion; and
said lock release mechanism comprises a push button which is provided on the side of said axis body and which comprises a projection which can be inserted into said stopper portion, and, by said projection being inserted into said stopper portion, said engagement body is pushed in against the resistance of the biasing force due to said biasing means, and thereby said lock is released.

2. A hinge device according to claim 1, wherein said hinge main body is assembled with a first assembly member and said axis body is assembled with a second assembly member, said torque characteristic possesses a bias in a direction to mutually contact said first and second assembly members when the rotation of said axis body is locked by said lock mechanism.

3. A hinge device according to claim 1, wherein said hinge main body is assembled with a first assembly member, said torque characteristic provides rotation in a direction to mutually separate said first and second assembly members at the moment that the locking by said lock mechanism has been released by said lock release mechanism.

4. A hinge device according to claim 1, wherein the surface of said engagement body which is pushed in by said projection is formed as a sloping surface, and thereby the pushing in force of said projection is converted into a shift force in the sideways direction of said projection and also into a rotational force of said push button.

5. A hinge device comprising:
a hinge element which has an axis body and a hinge main body and which is constructed so that said axis body possesses a predetermined torque characteristic around a rotational axis with respect to said hinge main body;
a lock mechanism which functions so as to lock rotational movement of said axis body around the rotational axis; and
a lock release mechanism which releases locking by said lock mechanism wherein:
said lock mechanism comprises a first lock member which is provided on the side of said axis body so as to be unable to move rotationally relative to said axis body, and a second lock member which is provided on the side of said hinge main body so as to be unable to move rotationally relative to said hinge main body;
said lock function by said lock mechanism is provided by concave and convex engagement of said axis body and said second lock member; and
said lock release mechanism is a mechanism which can release said concave and convex engagement.

6. A hinge device according to claim 5, wherein:
said second lock member comprises an axis portion which passes through said axis body extending along its axis, and which is biased so as to contact against said axis body by a biasing means; and
said lock release mechanism comprises a push button which is linked to the axis portion of said second lock member, and, by said push button being pushed in, said second lock member is separated from said axis body against the resistance of the biasing force due to said biasing means, and thereby said lock is released.

7. A hinge device according to claim 6, wherein, upon the concave and convex engagement surfaces of said axis body and said second lock member, there are provided sloping portions which guide an engagement convex portion into an engagement concave portion.

8. A portable electronic device comprising a portable electronic device main body and a flip lid which is linked to said portable electronic device main body so as to be able to open and shut with respect thereto, wherein, at least one of both end portions in the widthwise direction of a linking region of said flip lid with respect to said portable electronic device main body, linking of said portable electronic device main body and said flip lid is performed via a hinge device according to claim 1.

9. A portable electronic device comprising a portable electronic device main body and a flip lid which is linked to said portable electronic device main body so as to be able to open and shut with respect thereto, wherein, at least one of both end portions in the widthwise direction of a linking region of said flip lid with respect to said portable electronic device main body, linking of said portable electronic device main body and said flip lid is performed via a hinge device according to claim 2; in the closed state of said flip lid with respect to said portable electronic device main body, locking is performed by said lock mechanism; and, based upon said torque characteristic of said hinge element, said flip lid, in said closed state of said flip lid, is biased in the further closing direction with respect to said portable electronic device main body.

10. A portable electronic device comprising a portable electronic device main body and a flip lid which is linked to said portable electronic device main body so as to be able to open and shut with respect thereto, wherein, at least one of both end portions in the widthwise direction of a linking region of said flip lid with respect to said portable electronic device main body, linking of said portable electronic device main body and said flip lid is performed via a hinge device according to claim 3; in the closed state of said flip lid with respect to said portable electronic device main body, locking is performed by said lock mechanism; and, based upon said torque characteristic of said hinge element, said flip lid, at the instant when the locking by said lock mechanism is released, is opened away from said portable electronic device main body.

11. A hinge device according to claim 5, wherein said hinge main body is assembled with a first assembly member and said axis body is assembled with a second assembly member, said torque characteristic possesses a bias in a direction to mutually contact said first and second assembly members when the rotation of said axis body is locked by said lock mechanism.

12. A hinge device according to claim 5, wherein said hinge main body is assembled with a first assembly member and said axis body is assembled with a second assembly member, said torque characteristic provides rotation in a direction said first and second assembly members in a direction to mutually separate at the moment that the locking by said lock mechanism has been released by said lock release mechanism.

13. A portable electronic device comprising a portable electronic device main body and a flip lid which is linked to said portable electronic device main body so as to be able to open and shut with respect thereto, wherein, at least one of both end portions in the widthwise direction of a linking region of said flip lid with respect to said portable electronic device main body, linking of said portable electronic device main body and said flip lid is performed via a hinge device according to claim 11; in the closed state of said flip lid with respect to said portable electronic device main body, locking is performed by said lock mechanism; and, based upon said torque characteristic of said hinge element, said flip lid, in said closed state of said flip lid, is biased in the further closing direction with respect to said portable electronic device main body.

14. A portable electronic device comprising a portable electronic device main body and a flip lid which is linked to said portable electronic device main body so as to be able to open and shut with respect thereto, wherein, at at least one of both end portions in the widthwise direction of a linking region of said flip lid with respect to said portable electronic device main body, linking of said portable electronic device main body and said flip lid is performed via a hinge device according to claim 12; in the closed state of said flip lid with respect to said portable electronic device main body, locking is performed by said lock mechanism; and, based upon said torque characteristic of said hinge element, said flip lid, at the instant when the locking by said lock mechanism is released, is opened away from said portable electronic device main body.

* * * * *